US012724567B2

(12) United States Patent
Barber

(10) Patent No.: US 12,724,567 B2
(45) Date of Patent: Sep. 1, 2026

(54) METHOD AND APPARATUS FOR MANAGEMENT OF CONCURRENT DEPENDENT WRITES

(71) Applicant: Dell Products L.P., Round Rock, TX (US)

(72) Inventor: Michael Barber, Pearland, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/889,480

(22) Filed: Sep. 19, 2024

(65) Prior Publication Data

US 2026/0079643 A1 Mar. 19, 2026

(51) Int. Cl.
*G06F 3/06* (2006.01)

(52) U.S. Cl.
CPC .......... *G06F 3/0659* (2013.01); *G06F 3/0613* (2013.01); *G06F 3/0673* (2013.01)

(58) Field of Classification Search
CPC ..... G06F 3/0659; G06F 3/0613; G06F 3/0673
See application file for complete search history.

(56) References Cited

U.S. PATENT DOCUMENTS 8,046,548 B1 * 10/2011 Chatterjee ........... G06F 11/2064 711/135
2004/0049720 A1 * 3/2004 Boehler ................. G11C 29/48 714/718
2023/0124867 A1 * 4/2023 Han .................... G06F 16/2255 707/830

* cited by examiner

*Primary Examiner* — Janice M. Girouard
(74) *Attorney, Agent, or Firm* — Daly, Crowley, Mofford & Durkee, LLP

(57) ABSTRACT

A method comprising: transmitting, from a host device to a storage system, a set of P write requests, where P is a positive integer greater than one; waiting until an oldest one of the set of P write requests is positively acknowledged by the storage system; in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

19 Claims, 12 Drawing Sheets

Figure 2:
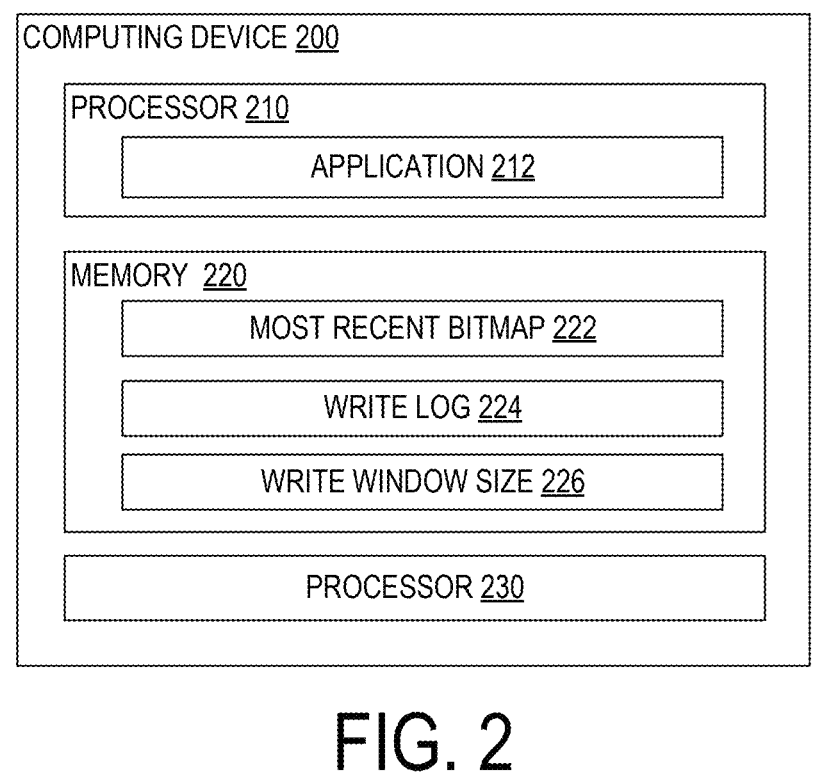

COMPUTING DEVICE 200
PROCESSOR 210
APPLICATION 212
MEMORY 220
MOST RECENT BITMAP 222
WRITE LOG 224
WRITE WINDOW SIZE 226
PROCESSOR 230

| | SERIAL NUMBER | TIMESTAMP | STATUS | ADDRESS THAT IS WRITTEN TO |
|---|---|---|---|---|
| 225 | REQUEST #1 | TIMESTAMP = 10 | ACKNOWLEDGED | 176 |
| 225 | REQUEST #2 | TIMESTAMP = 20 | ACKNOWLEDGED | 134 |
| 225 | REQUEST #3 | TIMESTAMP = 30 | ACKNOWLEDGED | 122 |
| 225 | REQUEST #4 | TIMESTAMP = 40 | ACKNOWLEDGED | 197 |
| 225 | REQUEST #5 | TIMESTAMP = 50 | IN-FLIGHT | 200 |
| 225 | REQUEST #6 | TIMESTAMP = 60 | IN-FLIGHT | 222 |
| 225 | REQUEST #7 | TIMESTAMP = 70 | IN-FLIGHT | 111 |
| 225 | REQUEST #8 | TIMESTAMP = 80 | ACKNOWLEDGED | 115 |
| 225 | REQUEST #9 | TIMESTAMP = 90 | IN-FLIGHT | 530 |
| 225 | REQUEST #10 | TIMESTAMP = 100 | IN-FLIGHT | 430 |
| 225 | REQUEST #11 | TIMESTAMP = 110 | IN-FLIGHT | 123 |
| 225 | REQUEST #12 | TIMESTAMP = 120 | ACKNOWLEDGED | 166 |
| 225 | REQUEST #11 | TIMESTAMP = 130 | IN-FLIGHT | 123 |
| 225 | REQUEST #12 | TIMESTAMP = 140 | IN-FLIGHT | 125 |

| BIT 7 | BIT 6 | BIT 5 | BIT 4 | BIT 3 | BIT 2 | BIT 1 | BIT 0 |
|---|---|---|---|---|---|---|---|
| 0 | 1 | 0 | 1 | 1 | 1 | 0 | 0 |

METHOD AND APPARATUS FOR MANAGEMENT OF CONCURRENT DEPENDENT WRITES

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: transmitting, from a host device to a storage system, a set of P write requests, where P is a positive integer greater than one; waiting until an oldest one of the set of P write requests is positively acknowledged by the storage system; in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

According to aspects of the disclosure, a system is provided, comprising: a memory; and at least one processor that is operatively coupled to the memory, the at least one processor being configured to perform the operations of: transmitting, from a host device to a storage system, a set of P write requests, where P is a positive integer greater than one; waiting until an oldest one of the set of P write requests is positively acknowledged by the storage system; in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

According to aspects of the disclosure, a non-transitory computer-readable medium is provided that stores one or more processor-executable instructions which, when executed by at least one processor, cause the at least one processor to perform the operations of: transmitting, from a host device to a storage system, a set of P write requests, where P is a positive integer greater than one; waiting until an oldest one of the set of P write requests is positively acknowledged by the storage system; in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a computing device, according to aspects of the disclosure;

FIG. 3 is a diagram of an example of a write log, according to aspects of the disclosure;

DETAILED DESCRIPTION

Figure 1A:
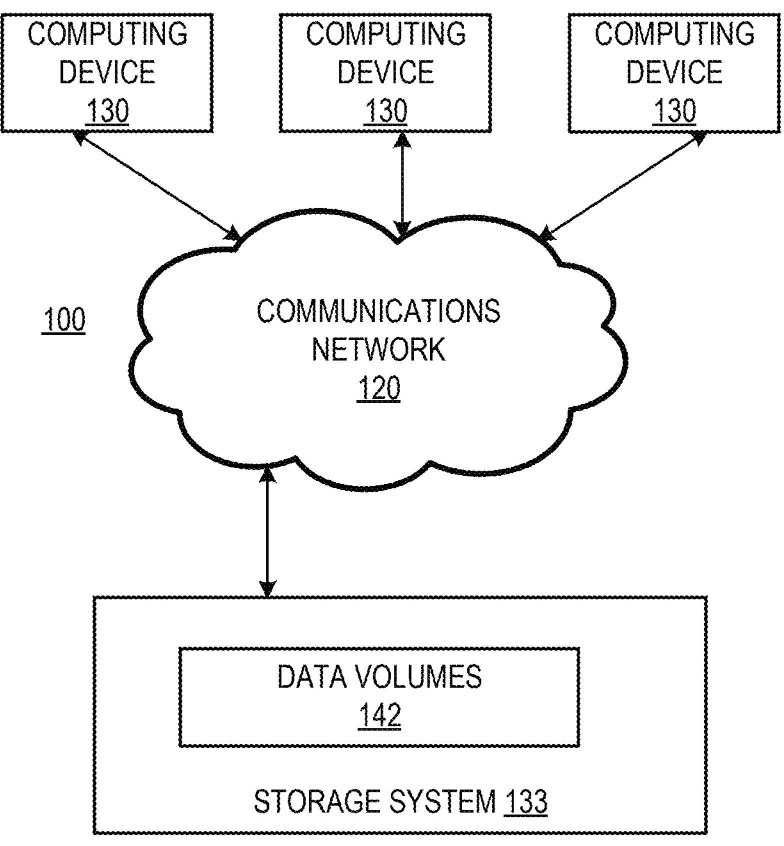
FIG. 1A is a diagram of an example of a system, according to aspects of the disclosure.

Some applications have stringent data consistency requirements which are met by ensuring that a write which depends on another write is not issued until the prior dependent write is positively acknowledged as committed to stable storage. This ensures the data will remain consistent in cases where power is lost, the host crashes, or a point-in-time replicated image of the data is created without quiesced writes.

Issuing writes in this fully-synchronous and serial manner creates a significant performance bottleneck when writing data to disk. It is desirable to be able to issue multiple concurrent writes in parallel for increased IO performance, however, there is no guarantee that the storage subsystem will process concurrent writes in the order they were issued, resulting in moments in time where the data will be inconsistent. If there is a point-in-time image created during this window of inconsistency, any recovery will see this as data corruption due to missing dependent writes.

At present, the need exists for a method for executing concurrent writes while providing a recovery mechanism to examine the data and reconcile any inconsistencies that may be present in the data set due to the unpredictable state of each write which was in flight at the time of the crash or point-in-time image creation. The present disclosure addresses this need.

According to the present disclosure, a method is provided for issuing concurrent (i.e., parallel) write requests. According to the method, a predetermined number P of write requests is issued in parallel by an application, after which the application waits for some of the write requests to be acknowledged by the storage system. As pending write requests are being positively acknowledged by the storage system, the application issues new write requests such that the number of pending write requests is kept by the application at or below the predetermined number P. The number P may be any positive integer greater than one. The number P is referred to as "the size of a write window" and it specifies the maximum number of write requests that can be in-flight (i.e., pending) at any given time. Similarly, the term "write window" refers to the feature whereby a computing device is limited to maintaining up to a predetermined number of in-flight write requests, such as the number P. In this regard, considering that the write window size is P, the phrase "current write window" may refer to the set of P write requests that are most recently transmitted by application or a device executing the application. Similarly, the phrase "the oldest write request in the current write window" may refer to the oldest one of the write requests in the set, and the phrase "the most recent write request in the current write window" may refer to the most recently transmitted write request in the set.

The phrase "parallel write requests" as used throughout the disclosure shall refer to a set of write requests in which each of the write requests is submitted before any of the other write requests in the storage system has been acknowledged by the storage system. Under the nomenclature of the present disclosure, a second write request is issued in parallel with a first write request, when the second write request is issued after the second write request but before the first write request is acknowledged. Similarly, in this example, the first write request is also said to have been issued in parallel with the second write request. Stated succinctly, the phrase "parallel write request" does not necessarily mean (although it could) that the write requests are issued at the same time; rather, it means that there is at least one moment when all of the write requests are in-flight (i.e., a moment in which all of the write requests have not yet been acknowledged).

In another aspect, each write request that is submitted to the storage system may include a bitmap. The bitmap that is part of any given write request may include a bitmap including at least P−1 bits, where each bit corresponds to a different one of a plurality of write requests that have been transmitted before the given write request, and where P is the write window size. When a bit is set to a first value (e.g., '0'), this may mean that the write request has not been acknowledged yet (e.g., positively acknowledged). When the bit is set to a second value (e.g., '1'), this may mean that the write request has already been acknowledged (e.g., positively acknowledged). An example of one possible implementation is provided with respect to FIG. 4.

In yet another aspect, by ensuring that no more than P write requests are issued in parallel, the method represents a way of getting around some of the performance problems that arise from issuing write requests just one at a time, synchronously, and waiting for each write to finish before issuing the next one. With the strategy advanced by the method, an application can issue a number of writes in parallel, while retaining a recovery mechanism (enabled by the maintenance of a respective bitmap for each write request) so that if a power outage or crash occur, one would still be able to determine the actual state of the storage system during recovery and proceed forward without crashing the application.

Stated succinctly, the method provides developers and system administrators with a tier of recoverability that is somewhere between the recoverability available when fully synchronous writes are practiced and when fully asynchronous writes are practiced. In other words, the method represents a middle ground between a first approach which involves issuing writes one by one, with each subsequent write being issued only after the previous write has been completed, and a second approach that involves issuing writes indiscriminately, without regard to which writes are completed and which writes have failed. An example of one possible implementation of the method is provided further below with respect to FIGS. 1-5. It will be understood that the FIGS. 1-5 are provided to illustrate one of many possible implementations of the method, and the present disclosure is not limited to the example of FIGS. 1-5.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from any of one or more data volumes 142 (or other storage objects) that are provided by the storage system 133. In some implementations, each of the computing devices 130 may be the same or similar to the computing device 180, which is discussed further below with respect to FIG. 1C. The communications network 120 may include one or more of the Internet, a local area network (LAN), a wide area network (WAN), an InfiniBand network, a mobile data network, etc.

Figure 1B:
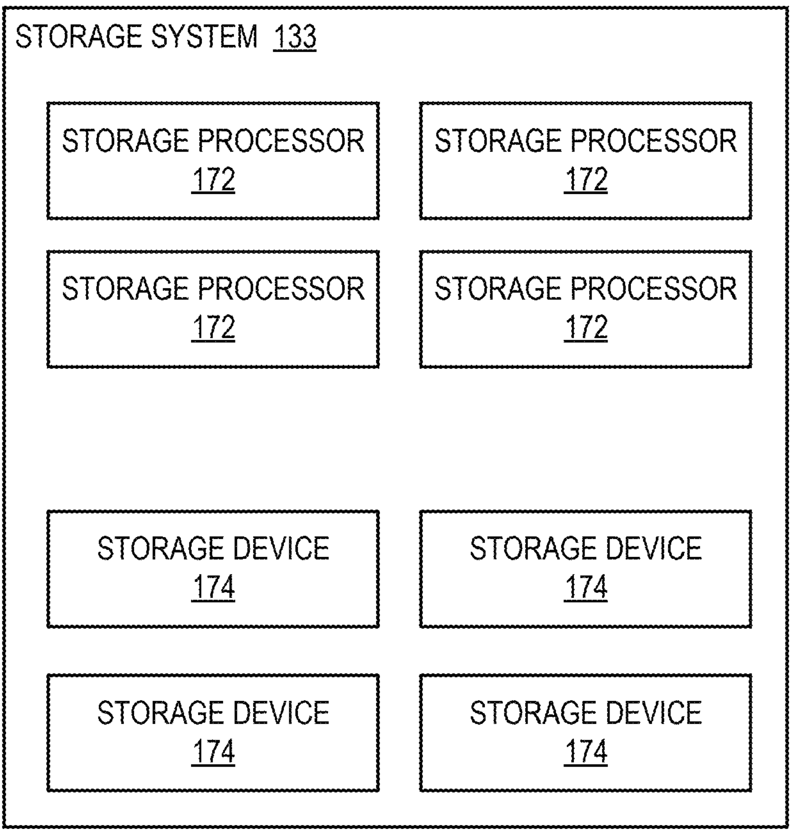
FIG. 1B is a diagram of an example of a storage system, according to aspects of the disclosure.

FIG. 1B is a diagram of an example of one possible implementation of storage system 133, according to aspects of the disclosure. As illustrated, the storage system 133 may include a plurality of storage processors 172 and a plurality of storage devices 174. Each of the storage devices 174 may include a hard disk (HD), a solid-state drive (SSD), a non-volatile random access memory (nvRAM) device, a non-volatile memory express (NVME) device, and/or any other suitable type of storage devices. Each of the storage processors 172 may include a computing device, such as the computing device 180, which is discussed further below with respect to FIG. 1C. Each of the storage processors 172 may be configured to execute I/O requests that are received at storage system 133 from computing devices 130 by reading or writing data to the storage devices 174.

Figure 1C:
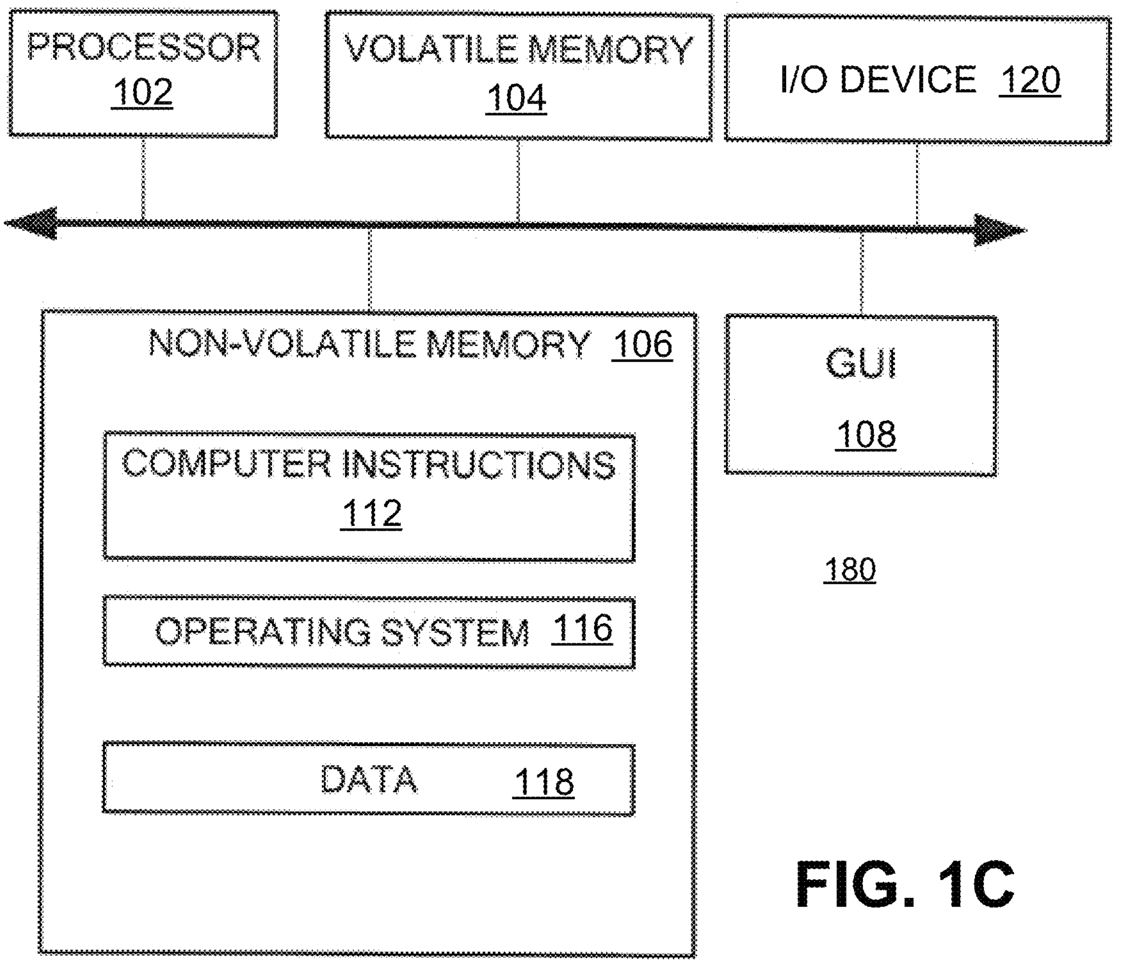
FIG. 1C is a diagram of an example of a computing device, according to aspects of the disclosure.

Referring to FIG. 1C, in some embodiments, a computing device 180 may include processor 102, volatile memory 104 (e.g., RAM), non-volatile memory 106 (e.g., a hard disk drive, a solid-state drive such as a flash drive, a hybrid magnetic and solid-state drive, etc.), graphical user interface (GUI) 108 (e.g., a touchscreen, a display, and so forth) and input/output (I/O) device 120 (e.g., a mouse, a keyboard, etc.). Non-volatile memory 106 stores computer instructions 112, an operating system 116 and data 118 such that, for example, the computer instructions 112 are executed by the processor 102 out of volatile memory 104. Program code may be applied to data entered using an input device of GUI 108 or received from I/O device 120.

FIG. 2 is a diagram of an example of a computing device 200, according to aspects of the disclosure. The computing device 200 may be the same or similar to any of the computing devices 130, which are discussed above with respect to FIG. 1A. As illustrated, computing device 200 may include a memory 220, a processor 210, and a communications interface 230. Memory 220 may include any suitable type of volatile or non-volatile memory, such as a solid-state drive (SSD), a hard disk (HD), a random-access memory (RAM), a Synchronous Dynamic Random-Access Memory (SDRAM), etc. Processor 210 may include any suitable type of processing circuitry, such as one or more of a general-purpose process (e.g., an x86 processor, a MIPS processor, an ARM processor, etc.), a special-purpose processor, an application-specific integrated circuit (ASIC), a field programmable gate array (FPGA), etc. The communications interface 230 may include any suitable type of communications interface. By way of example, the communications interface 230 may include one or more of an InfiniBand host bus adapter, an Ethernet adapter, or a Bluetooth adapter for example.

The processor 210 is configured to execute an application 212. Application 212 may include any software, or portion thereof, that is configured to read and write data to storage system 133. Application 212 may be configured to implement the method for writing data which is discussed above. Additionally, in some implementations, may be configured to implement any of processes 500, 600, 700, 800, 900, and 1000, which are discussed further below with respect to FIGS. 5-10.

Memory 220 may be configured to store a bitmap 222, a write log 224, and a write window size value 226. The write window size value 226 may be an integer value (e.g., a configuration setting) that identifies the maximum number of write requests that can be transmitted in parallel (or be in-flight at any given time). The write log 224 may be a log file that identifies all write requests that have been transmitted by application 212 to storage system 133. Bitmap 222 may be the bitmap contained in the most recent write request that was transmitted from application 212 to storage system 133. Bitmap 222 may have the same or similar format as bitmap 244, which is discussed further below with respect to FIG. 4B. Bitmap 222 may be used in various ways. For example, bitmap 222 may be used as a basis for generating a new bitmap for a subsequent write request that is going to be transmitted after the write request corresponding to bitmap 222, after which bitmap 222 may be replaced with the value of the next bitmap. As another example, if computing device 200 or storage system 133 fails, bitmap 222 may be used to identify the last batch of write requests that was transmitted in parallel (as part of the most recent write window), as well as their respective statuses. In this regard, bitmap 222 may be used to track down which write requests were pending at the time when the error occurred and retransmit those write requests. Moreover, as is discussed further below with respect to FIG. 9, bitmap 222 may be used for testing or debugging the software code that makes up storage system 133.

FIG. 3 provides an example of the write log 224, according to one possible implementation. In the example of FIG. 3, write log 224 is implemented as a table. However, the present disclosure is not limited to any specific implementation of write log 224. For example, the write log 224 may be implemented as a tree or another similar data structure. In the example of FIG. 3, write log 224 includes rows 225. Each row 225 corresponds to a different write request that has been transmitted from application 212 to storage system 133. Each row 225 may include a serial number of the row's corresponding write request, a timestamp of the row's corresponding write request, an indication of the status of the row's corresponding write request, and an indication of the target address of the row's corresponding write request. The serial number of any write request may include any number, string, or alphanumerical string. According to the present example, write requests issued by application 212 are assigned sequentially, such that one is able to discern the exact order in which the write requests are issued (e.g., transmitted) from them. For example, the first write request that is transmitted by application 212 may be assigned a serial number of '1', the second write request that is transmitted by application 212 may be assigned a serial number of '2', the third write request that is transmitted by application 212 may be assigned a serial number of '3', and so forth. As can be readily appreciated, the sequential assignment of serial numbers makes it possible to determine which serial number corresponds to what bit in the bitmap 222 (or another bitmap). The time stamp for each of the write requests may identify the time when the write request is transmitted. The status indicator for each request may indicate whether the request is acknowledged or still in-flight. The term "in-flight" as used throughout the disclosure means that the request has been transmitted to storage system 133 but no response has been received yet from storage system 133 that indicates whether the request was completed successfully or failed. The target address of a write request may be the address that is written to by the write request (i.e., the address where the user data associated with the write request is requested to be stored).

Figures 4A, 4B:
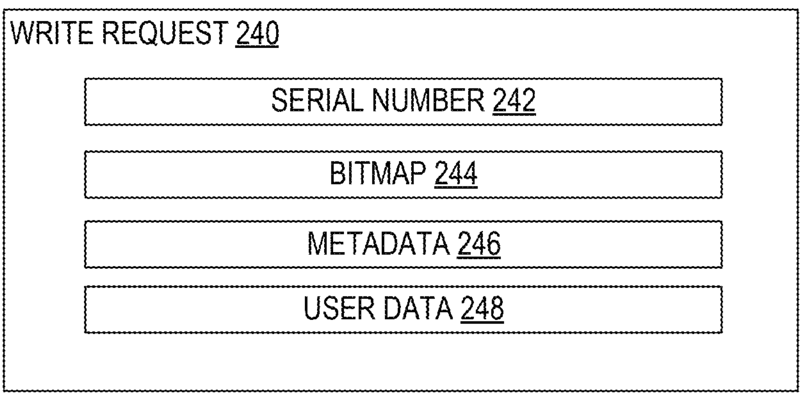
FIG. 4A is a diagram of an example of a write request 240, according to aspects of the disclosure.
FIG. 4B is a diagram of an example of a bitmap 244, according to aspects of the disclosure.

FIG. 4A is a diagram of an example of a write request 240, according to aspects of the disclosure. As illustrated, the write request 240 may include a serial number 242, a bitmap 244, metadata 246, and a data item 248. Serial number 242 may be the same or similar to the serial numbers discussed above with respect to FIG. 3. The bitmap 244 may be a bit string that identifies the status of a plurality of write requests that have been transmitted prior to the write request 240. An example of the bitmap 244 is discussed further below with respect to FIG. 4B. The data item 248 may include the payload of the write request—i.e., the user data that is desired to be stored as a result of executing the write request 240. The metadata 246 may include any suitable type of information that is needed for storing or interpreting the data item 248. By way of example, the metadata 246 may include one or more of an indication of a target address, an indication of a compression rate of the user data, and so forth.

FIG. 4B is a diagram of an example of the bitmap 244, according to aspects of the disclosure. In the present example, the number of bits in bitmap 244 is equal to P, where P is the write window size of computing device 200—i.e., the maximum number of write requests that are permitted to be in-flight at any given time. In the present example, P=8. However, the present disclosure is not limited to any specific value for the write window size P. Each of the bits in the bitmap 244 may correspond to a different write request that has been transmitted recently. According to the present example, bit 6 corresponds to the sixth most recent write request in the current write window of computing device 200. Bit 5 corresponds to the fifth most recent write request in the current write window. Bit 4 corresponds to the fourth most recent write request in the current write window. Bit 3 corresponds to the third most recent write request in the current write window. Bit 0 corresponds to the current write request in the current write window. Bit 1 corresponds to the newest write request in the current write window. And bit 2 corresponds to the second newest write request in the current write window.

The value of each of the bits in bitmap 244 may indicate the status of the bit's corresponding write request. According to the present example, a value of '0' means that the write request is in-flight (e.g., still pending) and a value of '1' means that the write request has been positively acknowledged by the storage system 133. In the example of FIG. 4B, the value of bit 0 indicates that the status of the write request corresponding to bit 0 is "in-flight"; the value of bit 1 indicates that the status of the write request corresponding to bit 1 is "in-flight"; the value of bit 2 indicates that the status of the write request corresponding to bit 2 is "acknowledged"; the value of bit 3 indicates that the status of the write request corresponding to bit 3 is "acknowledged"; the value of bit 4 indicates that the status of the write request corresponding to bit 4 is "acknowledged"; the value of bit 5 indicates that the status of the write request corresponding to bit 5 is "in-flight"; the value of bit 6 indicates that the status of the write request corresponding to bit 6 is "acknowledged"; the value of bit 7 indicates that the status of the write request corresponding to bit 7 is "acknowledged."

The example of FIGS. 4A-B assumes that write request 240 has been transmitted and is the most recent write request in the current write window of computing device 200. Although, in the example of FIGS. 4A-B, the bitmap 244 identifies the status of all write requests that make up the current write window, in alternative implementations, the bitmap 244 may include a respective bit for each of the write requests in the write window, other than the write request which contains the bitmap. Stated succinctly, the present disclosure is not limited to any specific implementation of bitmap 244.

Figure 5:
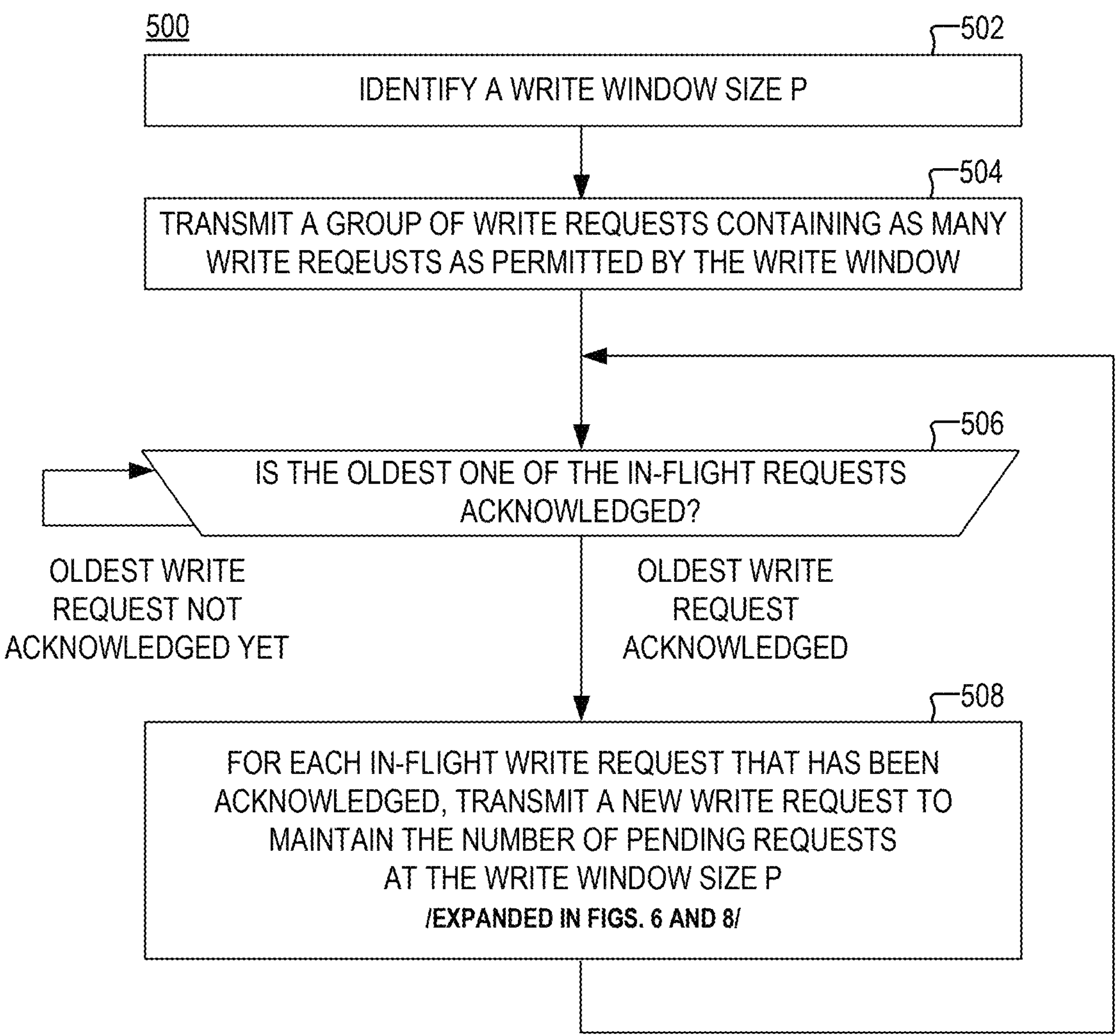
FIG. 5 is a flowchart of an example of a process, according to aspects of the disclosure.

FIG. 5 is a flowchart of an example of a process 500, according to aspects of the disclosure. According to the present example, process 500 is performed by application 212. However, it will be understood that the present disclosure is not limited to process 500 being performed by any entity or set of entities. At step 502, application 212 retrieves the value P of the write window size 226 (shown in FIG. 2). At step 504, application 212 transmits to storage system 133 a group of write requests. According to the present example, the group of write requests are transmitted in parallel, such that none of the write requests in the group is positively acknowledged (and/or required to be positively acknowledged) before all of the write requests in the group have been transmitted. The group of write requests includes P write requests. At step 506, application 212 waits for the oldest one of all in-flight requests that are transmitted by application 212 to be positively acknowledged. Specifically, at step 506, application 212 detects whether the oldest in-flight write request has been positively acknowledged (and is no longer in-flight). If the oldest in-flight write request has been positively acknowledged, process 500 proceeds to step 508. Otherwise, step 506 is repeated. At step 508, for each (or at least some) of the in-flight requests in the write window that have been positively acknowledged, application 212 transmits a new write request so as to maintain the total number of in-flight requests at a value that is less than or equal to the write window size P (retrieved at step 502). As can be readily appreciated, more than one write request may be transmitted at step 508 because more recent in-flight write requests may be positively acknowledged before the oldest in-flight write request. In some implementations, step 508 may be performed in the manner discussed further below with respect to FIGS. 6 and 8. According to the present example, a write request is "positively acknowledged" when an indication is received from storage system 133 that the write request may be considered to have been completed successfully. The positive acknowledgment may be transmitted when the write request is successfully completed (e.g., when the write request is committed to permanent storage) or when a certain progress has been made by storage system 133 towards the successful completion of the write request (e.g., the positive acknowledgment may be transmitted when the write request is cached but not yet committed to permanent storage, etc.). By the same token, a "negative acknowledgment" of a write request would be an indication that is received from storage system 133 that the write request cannot be completed successfully.

Figure 6:
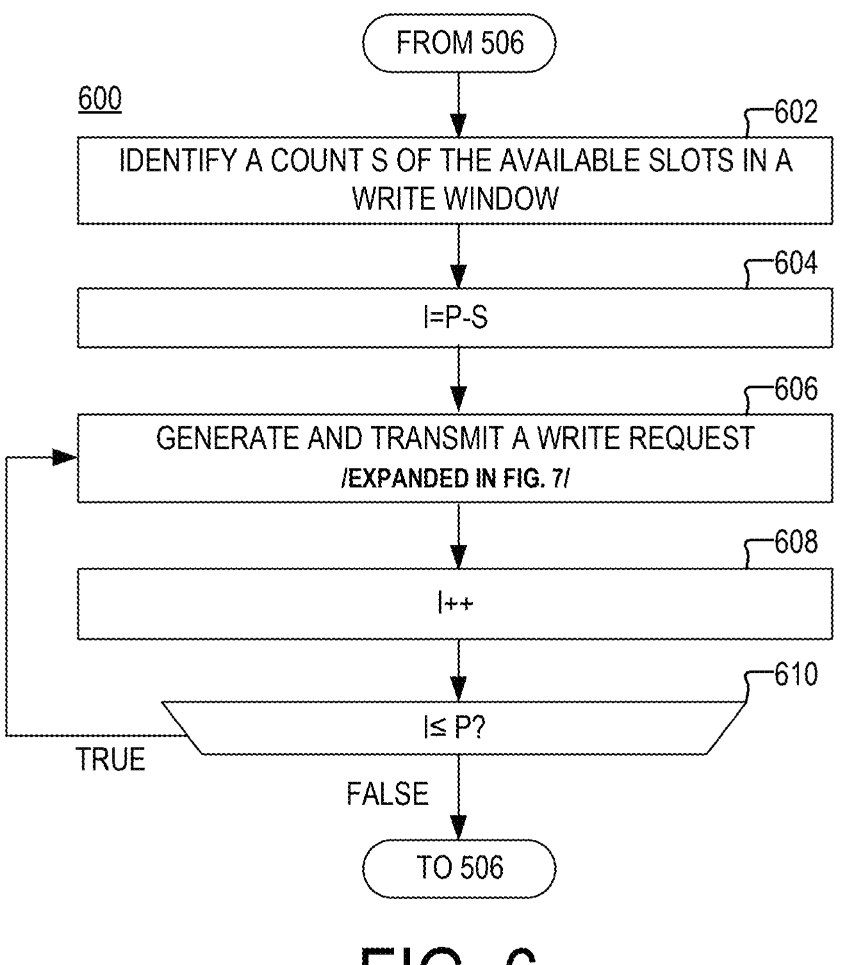
FIG. 6 is a flowchart of an example of a process, according to aspects of the disclosure.

FIG. 6 is a flowchart of an example of a process 600 for transmitting write requests, as specified by step 508 of process 500. At step 602, application 212 identifies a count S of available slots in the current write window. According to the present example, the count of available slots is equal to the number of write requests that have been completed since the most recent execution of step 508 (or since the execution of step 504 if step 506 has not been executed yet). At step 604, application 212 sets the value of counter I to equal the difference between the write window size P and the count S. At step 606, application 212 generates and transmits a write request. In some implementations, the write request may have the format discussed above with respect to FIG. 4A. However, it will be understood that the present disclosure is not limited to any specific format for the write request. In some implementations, step 606 may be performed in accordance with a process 700, which is discussed further below with respect to FIG. 7. At step 608, the counter I is incremented. At step 610, application 212 determines if counter I is less than or equal to the write window size P. If the counter I is less than or equal to the write window size P, process 600 returns to step 606. Otherwise, process 600 returns to step 506.

Figure 7:
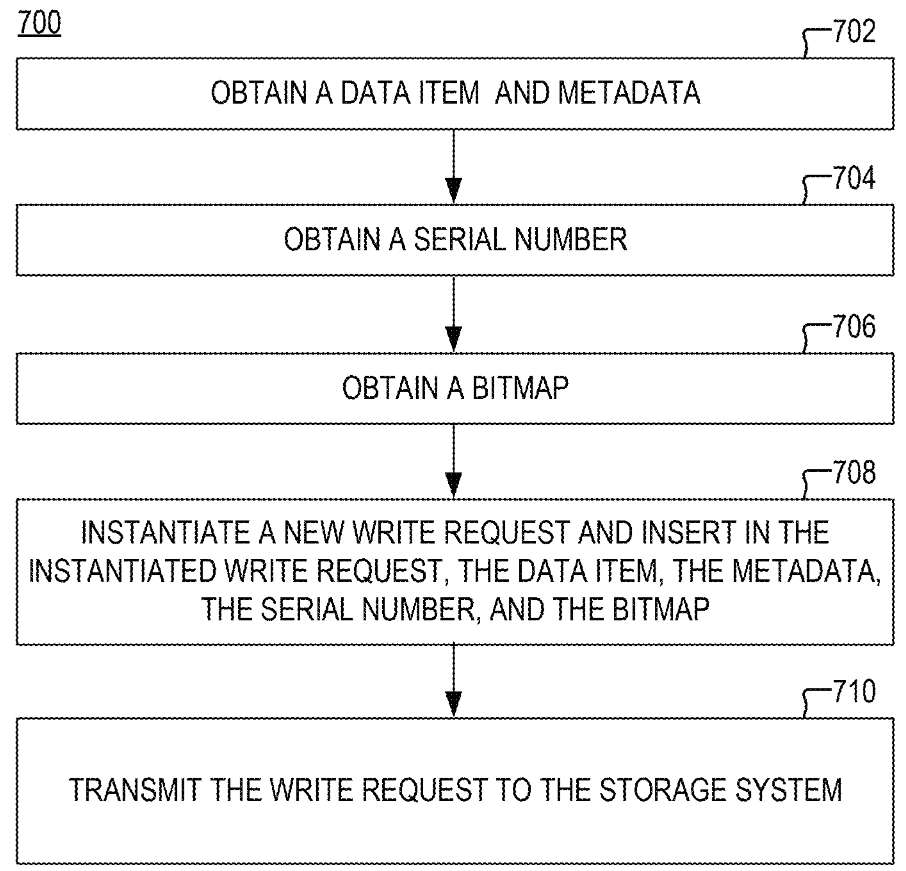
FIG. 7 is a flowchart of an example of a process, according to aspects of the disclosure.

FIG. 7 is a flowchart of a process 700 for transmitting a write request, as specified by step 606 of the process 600. At step 702, application 212 obtains a data item and metadata associated with the data item. In some implementations, the data item may be the same or similar to data item 248, which is discussed above with respect to FIG. 4A. In some implementations, the metadata may be the same or similar to the metadata 246, which is discussed above with respect to FIG. 4A. At step 704, application 212 generates a serial number for the write request. In some implementations, the serial number may be generated by incrementing by one the serial number of the last write request that was transmitted by application 212. In some implementations, the generated serial number may be the same or similar to the serial number 242, which is discussed above with respect to FIG. 4A. At step 706, application 212 generates a bitmap for the write request. The generated bitmap may have the same or similar format as the bitmap 244, which is discussed above with respect to FIG. 4B. The generated bitmap may be generated based on bitmap 222 (shown in FIG. 2). The bitmap 222 may be the bitmap contained in the most recently transmitted write request (i.e., the newest, up to this point, write request in the current write window). For example, the new bitmap may be generated by: (i) making a copy of bitmap 222, (ii) identifying the most significant bit in the copy whose value is "1", (iii) shifting right by one place all of the bits that are to the left of (or less significant) than the identified bit, (iv) performing a search of write log 224 to identify the status of the most recently transmitted write request (v) and setting the least significant bit in the bitmap to a value that corresponds to the identified status (e.g., '0' if the write request is in flight and '1' if the write request is positively acknowledged). As another example, application 212 may use write log 224 to generate the bitmap. Specifically, application 212 may use write log 224 to identify the P−1 most recent write requests that have been transmitted from application 212 to storage system 133. Next, application 212 may generate a blank bitmap (i.e., a bitmap where all bits have a value of 0). Next, application 212 may identify the respective status of each of the P−1 most recent write requests. And finally, the application may set to '1' the value of each of the bits in the (initially) blank bitmap which corresponds to write requests whose status is "acknowledged". At step 708, application 212 instantiates a new write request and inserts, in the instantiated write request, the user data, the metadata, and the new bitmap. At step 710, application 212 transmits the write request to storage system 133.

Figure 8:
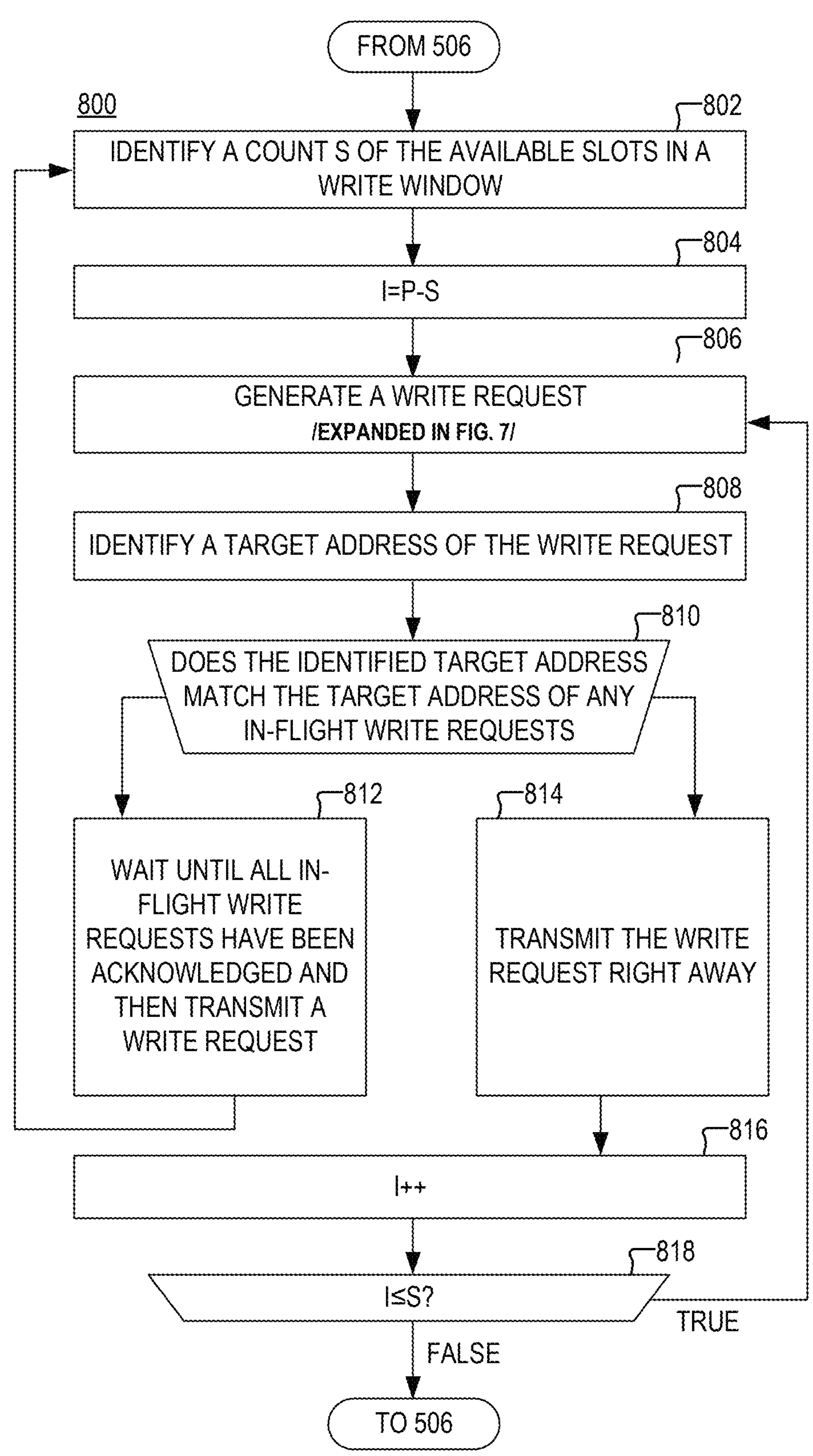
FIG. 8 is a flowchart of an example of a process, according to aspects of the disclosure.

FIG. 8 is a flowchart of an example of a process 800 for transmitting write requests, as specified by step 508 of process 500. At step 802, application 212 identifies a count S of available slots in the current write window. According to the present example, the count of available slots is equal to the number of write requests that have been completed since the most recent execution of step 508 (or since the execution of step 504 if step 506 has not been executed yet). At step 804, application 212 sets the value of counter I to equal the difference between the write window size P and the count S. At step 806, application 212 generates a write request. The write request may be generated in the manner discussed above with respect to FIG. 7. At step 808, application 212 identifies the target address of the generated write request (i.e., the storage location specified in the write request where the user data associated with the write request is going to be stored when the write request is executed). At step 810, application 212 determines if the target address (identified at step 808) is the same as (or otherwise matches) the target address of any of the write requests in the current write window which are still in-flight. In some implementations, step 810 may be performed by: (i) identifying one or more bits in the bitmap 222 whose value is '0', (ii) using write log 224 to identify the respective serial number of each of the write requests that correspond to the identified bits, (iii) using write log 224 to identify the respective target address of each of the identified write requests, and (iv) determining if the target address identified at step 808 is the same as any of the identified target addresses. At step 812, application 212 waits until all in-flight write requests have been positively acknowledged and then transmits the write request (generated at step 806). After step 812 is completed, process 800 returns to step 802. At step 814, application 212 transmits the write request that is generated at step 806 right away (i.e., without waiting for all in-flight write requests to complete). After step 814 is completed, process 800 proceeds to step 816. At step 816, the counter I is incremented. At step 818, application 212 determines if counter I is less than or equal to the write window size P. If the counter I is less than or equal to the write window size P, process 600 returns to step 606. Otherwise, process 600 returns to step 506. As used herein, the term "target address" may refer to any information that is used to identify a particular storage location. For instance, the term "target address" may refer to a logical block address, a physical address, a track ID, etc. In another example, the term "target address" may refer to a set of data items, such as a set consisting of a volume ID and a logical block address within the volume.

FIGS. 5-8 illustrate an example of a method in which a new write request is transmitted for each write request in the current write window that has been positively acknowledge. However, when a write request in the current write window is negatively acknowledged, application 212 may do what host applications normally do when there is an error. If the application is re-triable, application 212 may retransmit the write request (e.g., with the same serial number). If the error is not retriable (or fatal), application 212 may halt or abort the execution of any of the processes discussed with respect to FIGS. 5-8.

Figure 9:
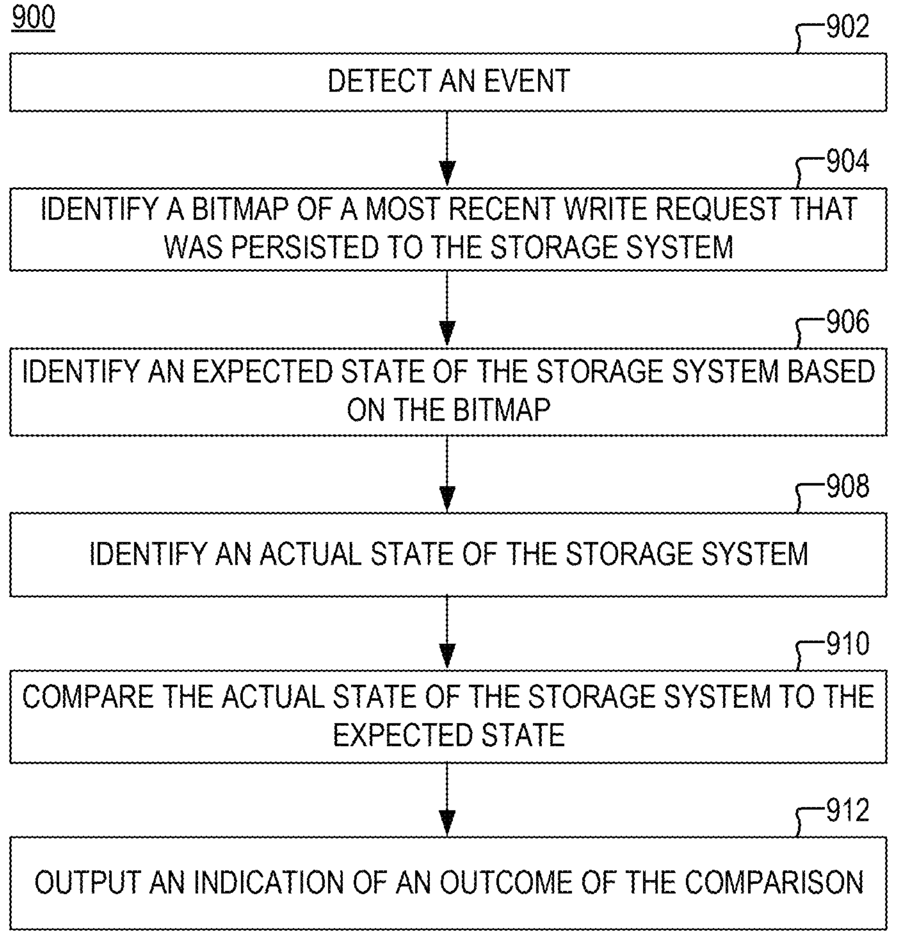
FIG. 9 is a flowchart of an example of a process, according to aspects of the disclosure.

FIG. 9 is a flowchart of a process 900, which is an example of one possible application of the method for data transmission. In the example of FIG. 9, the bitmaps contained in write requests transmitted from application 212 to storage system 133 are used to determine the expected state of storage system 133 (or a volume within storage system 133), after which the expected state is compared to the actual state of storage system 133 (or the volume within storage system 133) to determine whether storage system 133 is operating correctly. At step 902, an error or another event is detected in storage system 133 or computing device 200. At step 904, the bitmap 222 is retrieved. As noted above with respect to FIG. 2, the bitmap 222 may be the bitmap that is contained in the write request that was most recently persisted to stable storage by application 212. The request that was most recently transmitted may be the last request that was copied from the cache of storage system 133 to one or more of the storage devices 174. At step 906, an expected state of storage system 133 (or a volume within storage system 133) is determined based on the bitmap 222. At step 908, the actual state of storage system 133 (or the volume within storage system 133) is determined. At step 910, the expected state of storage system 133 (identified at step 906) is compared to the actual state of storage system 133 (identified at step 908). At step 912, an indication of the outcome of the comparison is output for presentation to a user. In some implementations, the indication may include a number, string, alphanumerical string, image, or sound that is at least in part indicative of whether the actual state of the storage system 133 matches the expected state of storage system 133. Outputting the indication may include one or more of transmitting the indication over a communications network, displaying the indication on a display device of computing device 200, storing the indication in a database, and/or taking any suitable action that would make the indication available for viewing by a user.

In some implementations, identifying the expected state of storage system 133 (or a volume within storage system 133) may be performed by: (i) using bitmap 222 to identify all acknowledged write requests that are part of the current write window and (ii) identifying the user data that was written with those write requests. In some implementations, determining if the actual state of storage system 133 matches the expected state may include detecting whether the user data that was written with the write requests that have been acknowledged is indeed present in storage system 133. If the user data is present in storage system 133, a determination may be made that the actual state matches the expected state. Otherwise, if the user data is not present, a determination may be made that the actual state does not match the expected state. In some implementations, information about whether the actual state matches the expected state may be useful for debugging or otherwise testing the software code used to implement the storage system 133. In other words, in some instances, the techniques for write request transmission which are discussed with respect to FIGS. 1-8 may be used for debugging purposes.

Figure 10:
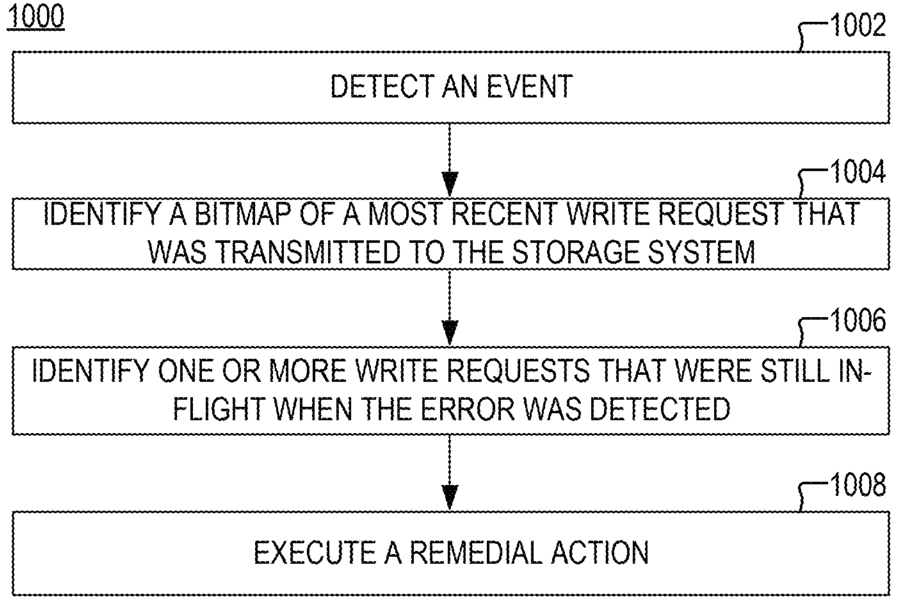
FIG. 10 is a flowchart of an example of a process, according to aspects of the disclosure.

FIG. 10 is a flowchart of a process 1000, which is an example of one possible application of the method for data transmission. In the example of FIG. 10, the bitmaps which are contained in the write requests that are transmitted from application 212 to storage system 133, are used to identify in-flight requests which were prevented from being completed successfully by an error (or another event) in storage system 133, after which a remedial action is taken with respect to those write requests. At step 1002, an error or another event is detected in storage system 133 or computing device 200. At step 1004, the bitmap 222 is retrieved. At step 1006, one or more in-flight write requests are identified based on the bitmap. At step 1008, a remedial action is executed with respect to the identified write requests. The remedial action may include re-transmitting the write requests or storing in the memory of computing device 200 (or another device) an identification of the identified write requests. The present disclosure is not limited to any specific remedial action.

FIGS. 1-10 are provided as an example only. In some embodiments, the term "I/O request" or simply "I/O" may be used to refer to an input or output request. At least some of the steps discussed with respect to FIGS. 1-10 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:

transmitting, from a host device to a storage system, a set of P write requests, where P is a positive integer greater than one;

waiting until an oldest one of the set of P write requests is positively acknowledged by the storage system;

in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system, wherein the new write request is transmitted only when the new write request does not overwrite a storage location that is written to by an in-flight write request that is part of the set of P write requests.

2. The method of claim 1, wherein each of the write requests in the set of P write requests includes a serial number that is indicative of an order in which the write request is generated relative to the remaining ones of the set of P write requests.

3. The method of claim 1, wherein the write requests in the set of P write requests are transmitted in parallel.

4. The method of claim 1, wherein transmitting the new write request includes:

detecting whether a first target address of the new write request matches a second target address of any in-flight write request that is part of the set of P write request;

when the first target address matches the second target address, waiting for all write requests in the set of P write requests to be positively acknowledged by the storage system before transmitting the new write request to the storage system; and when the first target address does not match the second target address, transmitting the write request to the storage system without waiting all write requests in the set of P write requests to be positively acknowledged.

5. The method of claim 1, further comprising:

identifying an expected state of the storage system based on the bitmap;

detecting whether the expected state matches an actual state of the storage system; and outputting an indication of an outcome of the comparison.

6. The method of claim 1, wherein any of the bits in the bitmap is set to a first value when the bit's corresponding write request has been positively acknowledged, and any of the bits in the bitmap is set to a second value when the bit's corresponding write request is still in-flight.

7. A system, comprising:

a memory; and at least one processor that is operatively coupled to the memory, the at least one processor being configured to perform the operations of:

transmitting, from a host device to a storage system, a set of P write requests, where P is a positive integer greater than one;

waiting until an oldest one of the set of P write requests is positively acknowledged by the storage system;

in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

8. The system of claim 7, wherein each of the write requests in the set of P write requests includes a serial number that is indicative of an order in which the write request is generated relative to the remaining ones of the set of P write requests.

9. The system of claim 7, wherein the write requests in the set of P write requests are transmitted in parallel.

10. The system of claim 7, wherein the new write request is transmitted only when the new write request does not overwrite a storage location that is written to by an in-flight write request that is part of the set of P write requests.

11. The system of claim 7, wherein transmitting the new write request includes:

detecting whether a first target address of the new write request matches a second target address of any in-flight write request that is part of the set of P write request;

when the first target address matches the second target address, waiting for all write requests in the set of P write requests to be positively acknowledged by the storage system before transmitting the new write request to the storage system; and when the first target address does not match the second target address, transmitting the write request to the storage system without waiting all write requests in the set of P write requests to be positively acknowledged.

12. The system of claim 7, wherein the at least one processor is further configured to perform the operations of:

identifying an expected state of the storage system based on the bitmap;

detecting whether the expected state matches an actual state of the storage system; and outputting an indication of an outcome of the comparison.

13. The system of claim 7, wherein any of the bits in the bitmap is set to a first value when the bit's corresponding write request has been positively acknowledged, and any of the bits in the bitmap is set to a second value when the bit's corresponding write request is still in-flight.

14. A non-transitory computer-readable medium storing one or more processor-executable instructions which, when executed by at least one processor, cause the at least one processor to perform the operations of:

transmitting, from a host device to a storage system, a set of P write requests, where P is a positive integer greater than one;

waiting until an oldest one of the set of P write requests is positively acknowledged by the storage system;

in response to detecting that the oldest one of the set of P write requests has been positively acknowledged, generating a new write request including a serial number and a bitmap, each bit in the bitmap corresponding to a different one of the set of P write requests, each bit in the bitmap being indicative of whether the bit's corresponding write request has been positively acknowledged by the storage system; and transmitting the new write request from the host device to the storage system.

15. The non-transitory computer-readable medium of claim 14, wherein each of the write requests in the set of P write requests includes a serial number that is indicative of an order in which the write request is generated relative to the remaining ones of the set of P write requests.

16. The non-transitory computer-readable medium of claim 14, wherein the write requests in the set of P write requests are transmitted in parallel.

17. The non-transitory computer-readable medium of claim 14, wherein the new write request is transmitted only when the new write request does not overwrite a storage location that is written to by an in-flight write request that is part of the set of P write requests.

18. The non-transitory computer-readable medium of claim 14, wherein transmitting the new write request includes:

detecting whether a first target address of the new write request matches a second target address of any in-flight write request that is part of the set of P write request;

when the first target address matches the second target address, waiting for all write requests in the set of P write requests to be positively acknowledged by the storage system before transmitting the new write request to the storage system; and when the first target address does not match the second target address, transmitting the write request to the storage system without waiting all write requests in the set of P write requests to be positively acknowledged.

19. The non-transitory computer-readable medium of claim 14, wherein any of the bits in the bitmap is set to a first value when the bit's corresponding write request has been positively acknowledged, and any of the bits in the bitmap is set to a second value when the bit's corresponding write request is still in-flight.

* * * * *